Sept. 24, 1957 D. J. OLDENBOOM 2,807,190

OPTICAL UNIT FOR USE IN A RECORD CONTROLLED MACHINE

Filed April 27, 1956 4 Sheets-Sheet 1

INVENTOR
DERK J. OLDENBOOM
BY Wesley De Bruin
ATTORNEY

Sept. 24, 1957 D. J. OLDENBOOM 2,807,190

OPTICAL UNIT FOR USE IN A RECORD CONTROLLED MACHINE

Filed April 27, 1956 4 Sheets-Sheet 2

Sept. 24, 1957 D. J. OLDENBOOM 2,807,190

OPTICAL UNIT FOR USE IN A RECORD CONTROLLED MACHINE

Filed April 27, 1956 4 Sheets-Sheet 3

OPTICAL UNIT FOR USE IN A RECORD CONTROLLED MACHINE

Filed April 27, 1956 4 Sheets-Sheet 4

United States Patent Office 2,807,190

Patented Sept. 24, 1957

2,807,190

OPTICAL UNIT FOR USE IN A RECORD CONTROLLED MACHINE

Derk J. Oldenboom, Johnson City, N. Y., assignor to International Business Machines Corporation, New York, N. Y., a corporation of New York Application April 27, 1956, Serial No. 581,015

7 Claims. (Cl. 88—24)

This invention relates to an optical unit and more particularly to an optical unit that can be efficiently employed in a record card controlled electrographic "card-to-card" printer.

The optical unit disclosed and claimed herein may be employed in the record card controlled electrographic printer disclosed and claimed in the U. S. patent application of Martin J. Kelly, Serial No. 556,176, filed on December 29, 1955. Reference is also made to the U. S. patent application of I. M. Hix, Serial No. 556,216, filed on December 29, 1955 and entitled "Record Card Controlled Electrographic Printer," and the U. S. patent application of C. J. Fitch, Serial No. 419,314, filed on March 29, 1954 and entitled "Printing Machine." All of the above-referred to applications are of common assignee herewith. The above-identified applications will be respectively referred to hereinafter as the Kelly application, the Hix application, and the Fitch application.

Briefly, the novel device disclosed and claimed herein relates to an adjustable optical system for accepting an optical image of information visually apparent, or printed, on a primary record card and through the medium of a suitably positioned first mirror, lens structure, and second mirror, impressing this optical image on a rotating xerographic drum. The term "xerographic drum" is fully defined in the Kelly application, in particular page 1, line 22 through page 2, line 7 thereof.

More particularly, however, the present invention is directed to a first manually operative mechanism for effecting displacement of the optical image obtained from the primary record card horizontally or parallel to the axis of rotation of the "xerographic drum" and further, to a second independently operative mechanism for effecting a physical displacement of the optical image along the circumferential periphery of the xerographic drum. The displacement of the optical image obtained from the primary record card to a physical position on the xerographic drum parallel to the axis of rotation of said drum is obtained in a very simple manner, namely, the physical displacement of the lens system parallel to the axis of rotation of the xerographic drum and parallel to the surfaces of said first and second mirrors. As will appear more fully hereinafter, the displacement of the optical image obtained from the primary record card along the circumferential periphery of the zerographic drum is obtained by movement of said second mirror along an elliptical path that is optically judiciously displaced from the axis of rotation of said xerographic drum and the pivotal axis of said first mirror; and simultaneously with the displacement of said second mirror along said elliptical path causing said first mirror and said lens system to be subjected to displacement so as to cause the optical image obtained from said primary record card to traverse an optically constant path.

The preferred embodiment of the present invention will be disclosed as embodied in an xerographic printing machine capable of producing a facsimile of visible information appearing on source information primary records, such as the well-known IBM record cards for example, on other related image information receiving secondary records which might also be IBM record cards. That is, as disclosed in detail in the Kelly application, source information primary cards which may also have machine control data recorded thereon, are fed, one-by-one, past a control data sensing station and a source information optical scanning station. Image information receiving secondary cards which too may have machine control data recorded thereon, are fed, one-by-one, past a control data sensing station, a xerographic toner image transfer station and a toner image fixing station. The optical image of the source information carried by each primary card and produced by apparatus in the aforementioned scanning station, is stored in a conventional manner as a latent electrostatic image on the surface of a constantly rotating xerographic drum. Thus, a latent electrostatic image of the source information on each of the primary cards advanced successively past the optical scanning station, will appear in a series formation of such images about the peripheral surface of the xerographic drum. After each of these images is developed, the same is moved to the aforesaid toner image transfer station for transfer onto a clean surface of a related secondary card.

In addition to the foregoing, the xerographic printer disclosed in the Kelly application includes added features which cooperate to provide a record card controlled card-to-card xerographic printer that can afford a variety of different operations. That is, the primary and secondary card control data that is recorded on the cards and read at their respective sensing stations, can be used to govern various machine operations. For example, by comparing the primary and secondary card control data, the xerographic printer can be controlled to effect a transfer of primary card source information onto only certain secondary cards which are related to the primary cards by the control data recorded thereon. Hence, for example, those xerographic images associated with primary cards which lack corresponding secondary cards, will not be transferred, i. e., printed, onto secondary cards. On the other hand, those secondary cards which lack corresponding primary cards will be advanced through the aforementioned transfer station while the apparatus thereof is disabled, so that a transfer or print operation is not effected. It might be well to bring out here that the transfer station apparatus is similar to the shiftable transfer roller apparatus shown and described in the copending Fitch application. Furthermore, in line with the foregoing example, the xerographic printer of the Kelly application can be governed in accordance with the primary and secondary card control data, to cause the primary cards whose source information has been copied to be stacked in a compartment other than the one for storing the primary cards whose source information has not been copied. Similarly, the xerographic printer of the Kelly application can be governed to cause the secondary cards whereon information has been printed, to be stacked in a compartment other than in one for storing blank secondary cards.

The various machine features and operations of the xerographic printer of the Kelly application, briefly described hereinabove, are simply indicative of the versatility and flexibility of the preferred embodiment of the Kelly application and should not be construed as limitations of the present invention.

A primary object of the present invention is to provide a relatively simple and efficient optical system for conveying an optical image received along a first geometrically fixed optical path to the surface of a drum, and permitting a great deal of flexibility as to the peripheral area on said drum onto which said optical image is projected.

A second object of the present invention is an improved optical system for conveying information optically read from a primary record card to the peripheral surface of a xerographic drum and permitting physical displacement of said optical image, independently, parallel to the axis of rotation of said drum and peripherally about the circumference of said drum.

A third object of the present invention is a simple optical system employing a minimum number of components that is highly flexible, reliable in operation, and is particularly well adapted to employment in a printer generally of the xerographic type.

Other objects of the invention will be pointed out in the following description and claims and illustrated in the accompanying drawings, which disclose, by way of example, the principle of the invention and the best mode, which has been contemplated, of applying that principle.

Figure 1:
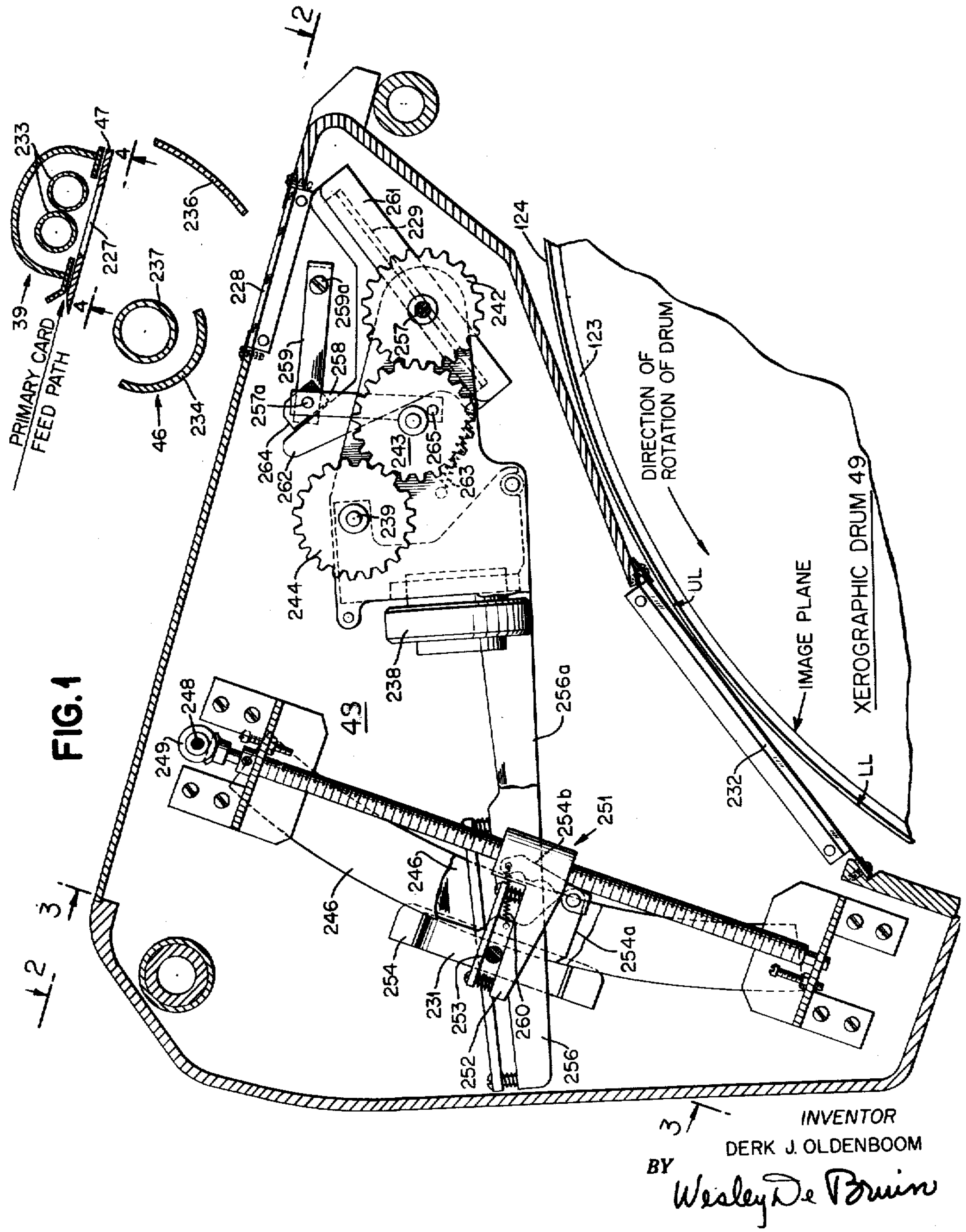
Fig. 1 is a view of the optical scanning system for projecting optical images of primary medium source information onto the surface of a xerographic drum.
Figure 4:
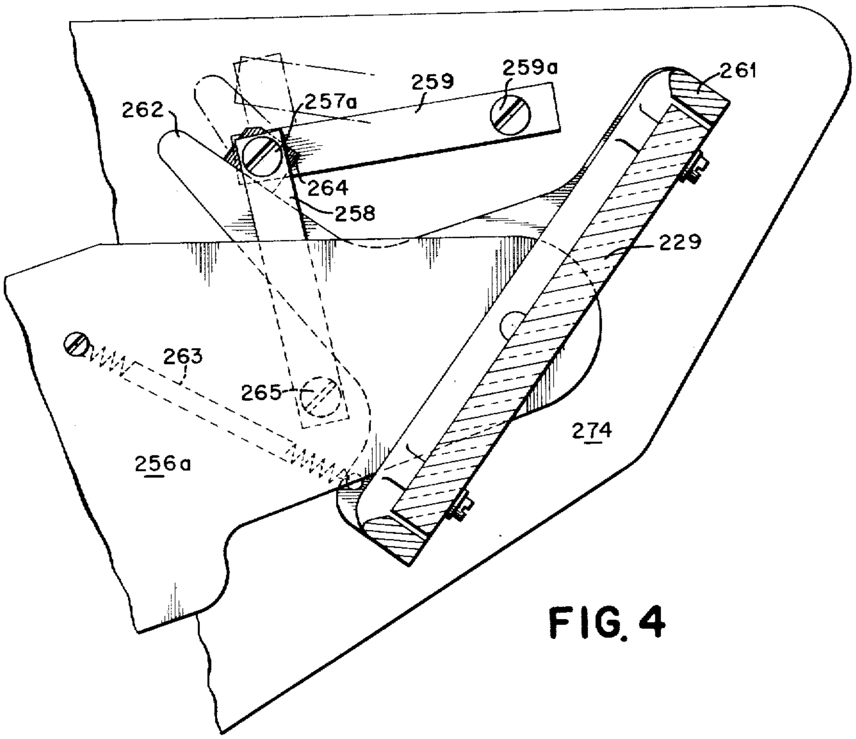
Figure 5:
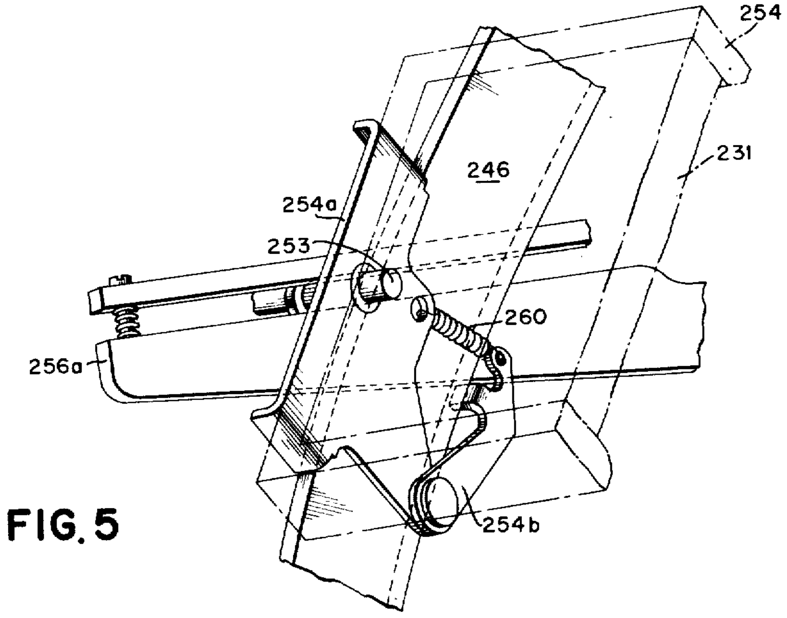

Fig. 4 is a detailed showing of the portion of Fig. 1 directed to the support and angular displacement of mirror 229; and Fig. 5 is a detailed showing of the portion of Fig. 1 and directed to the detailed structure supporting mirror 231 so as to cause it to follow the elliptical path 246 of Fig. 1.

*Optical image projecting unit*

Referring to Fig. 1 of the Kelly application, it will be appreciated that incremental areas of the photoconductive insulating layer 124 are electrically charged positive by the ion-producing unit 126, and then are moved past the optical image projecting station apparatus 48 (Fig. 1 hereof). As each primary card 21 having printed information thereon (see also Fig. 4 of the Kelly application) is advanced past the scanning station 39 (Fig. 1, hereof), the optical image thereof is projected from scanning slot 227 through a glass member 228, a pair of mirrors 229 and 231, and another glass member 232, onto the already electrically charged surface of the photoconductive insulating layer 124. Reference might be made at this time to Fig. 4 of the Kelly application, for a schematic showing of a punched hole IBM type primary card 21 having printed information thereon, in a position relative to the member 47 having the scanning slot 227. It is to be appreciated that the view shown in Fig. 4 of the Kelly application is taken along the line 4—4 of Fig. 1 hereof.

The scanning station 39, Fig. 1 hereof, includes a light source 233 within a suitable chamber for preventing images of the punched holes found in the primary card from forming. The light source 233 concentrates the light energy produced on the back side of the primary cards at station 39 to illuminate the punched holes and thereby prevents images of these holes from being formed and projected onto the surface of xerographic drum 49. The single light ray projector 46 includes a pair of elliptical trough reflectors 234 and 236 whose center sections are each covered with a diffuse reflecting material, whereas the remaining area sections are each covered with a specular material. As a result, the irradiance across the image plane on the surface of the xerographic drum as defined for all practical purposes by the length of scanning slot 227 (see also Fig. 4 of the Kelly application), is uniform. This uniform irradiance is, of course, highly desirable in order that the latent electrostatic image formed on the surface of insulating layer 124 across the entire width of the xerographic drum 49 (Fig. 1, hereof) is of constant charge intensity, to thereby provide uniform density printing.

The primary cards 21 (Fig. 4 of the Kelly application) bearing the information to be transferred onto corresponding secondary cards 51 (see also Fig. 1 of the Kelly application), may be wider than the xerographic drum 49. In fact, if the well-known eighty column IBM record cards are used, with the preferred embodiment of the Kelly application, the width of these cards will exceed the width of the xerographic drum 49 by approximately two inches. Thus, to avoid losing any of the primary card information image, a suitable lens apparatus is required to accept the image of the information on the primary card wherever it may be, and to then direct it onto any portion of the surface of the xerographic drum 49. It will be appreciated that this also adds a great deal of flexibility to an xerographic printer generally of the Kelly application type. The lens apparatus for shifting the image of the primary card information along the width of the xerographic drum 49 is identified in Fig. 1 by reference numeral 238. The lens 238 is moved by a worm drive **239*a* associated with shaft 239, in a direction perpendicular to the view shown in Fig. 1, by a manually operable crank 241 (see also Fig. 1 of the Kelly application) which is rotated so as to cause a gear 242 (Figs. 1 and 2) to rotate. Gear 242 is mechanically directly connected to crank 241. As may readily be seen in Fig. 1, shaft 239 is also caused to rotate via gears 242—244 when the crank 241 is operated. A worm drive 239a (Fig. 2) for lens 238 is associated with driven shaft 239 so as to move the lens in a direction normal to the view shown in Fig. 1. Whether this movement is forward or reverse depends upon the direction of rotation of crank 241 (see also Fig. 1 of the Kelly application). As a result of the lens movement, the image of the information on the primary record card, as projected onto mirror 229, is caused to be shifted in a direction parallel to the width of the xerographic drum 49. This horizontally shiftable image is directed onto mirror 231 and is then projected onto the surface of the xerographic drum as afore-described. Accordingly, it is by this lens moving mechanism that primary card information taken from any portion of the primary card may be shifted in a horizontal direction so as to appear in a non-corresponding region of the secondary card. In other words, the name and address information appearing on the primary card 21** (see Fig. 4 of the Kelly application) in the left-hand corner, may be shifted so that the printed image thereof will appear on the right-hand side of a corresponding secondary card.

Figure 2:
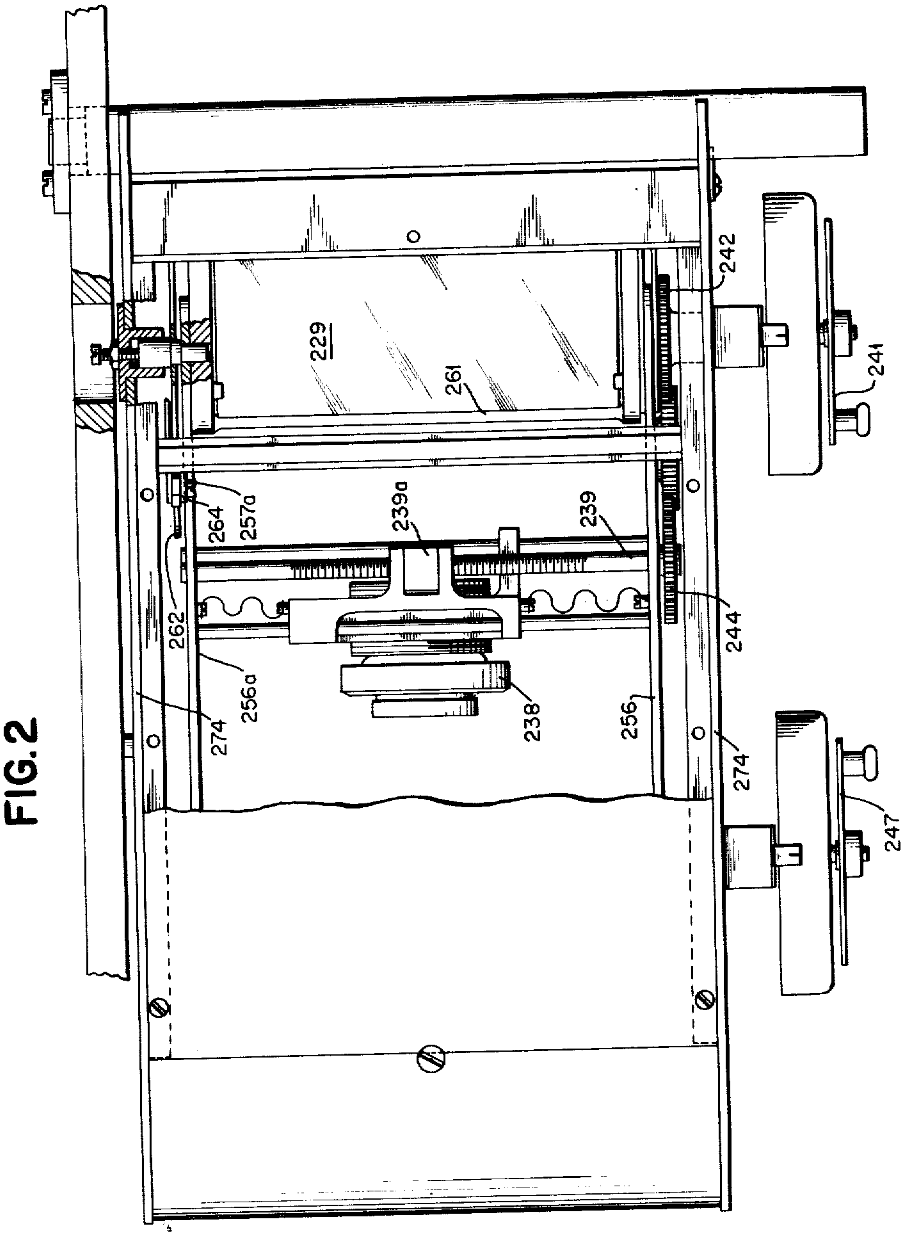
Fig. 2 is a view of the optical scanning system of Fig. 1 taken along the line 2—2 of Fig. 1.
Figure 3:
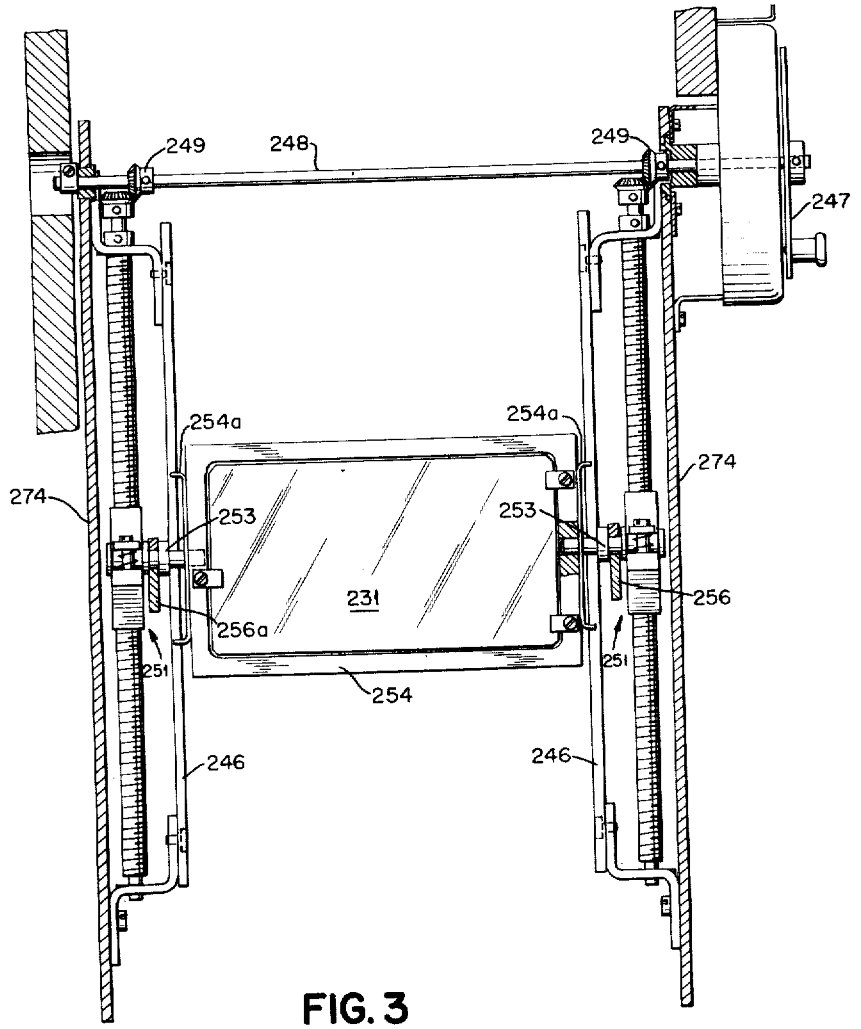
Fig. 3 is a view of the optical scanning system of Fig. 1 taken along the line 3—3 of Fig. 1.

It is not only desirable to be able to shift the image of the information being transferred in one direction, i. e., the so-called horizontal direction, but it is equally desirable to have means provided whereby the image can be independently shifted in another direction, i. e., the so-called vertical direction. This is accomplished in the present machine by in effect either advancing or retarding the position of the image circumferentially, relative to the peripheral surface of the xerographic drum 49. Referring to the optical projecting station apparatus 48 (Fig. 1), mirror 231 can be moved along its pair of spaced guide members 246, there being one such guide member located on either end of the mirror frame 254 (see Fig. 3). Mirror 231 is moved when manually operable crank 247 (Fig. 2) is rotated. Crank is operatively connected to shaft 248 (Figs. 1 and 3). Bevel gears 249 are secured to shaft 248 in order that any rotational movement imparted to crank 247 will effect the operation of the worm drives indicated by reference numerals 251. From Fig. 3 it will be seen that there is a worm drive 251 on each side of mirror frame 254. However, for the sake of simplicity, only the drive and associated mechanism on the side of frame 274 shown in Fig. 1, will be described. Thus, should the worm drive 251 impart a movement to its L-shaped member 252 (Fig. 1)

in an upward direction, for example, a similar movement will be imparted to mirror 231 via the stud 253. This connecting stud is attached to the mirror frame 254, and is connected to the L-shaped member 252 by a pin and slot arrangement in order that the mirror frame 254 is always free to slide on its pair of guide members 246. The mirror frame 254 is maintained in direct contact with the curved surface of each guide member 246 by a conventional spring biasing arrangement shown in detail in Fig. 5 to include spring 260 and members **254*a* and 254*b*. Intermediate each L-shaped member 252 (there being one on each side of frame 274) and the mirror frame 254, there is positioned a long pivotally mounted arm, namely, 256 and 256*a*. Each of the arms 256 and 256*a* is pivotable about shaft 257 (Fig. 1). Arm 256 is connected by a pin and slot arrangement to the afore-mentioned stud 253, so that lens 238 which is supported, in part, by the arms 256 and 256*a*, is always aligned with mirrors 231 and 229. As a result, the optical image projected from mirror 229 through lens 238 is always beamed towards mirror 231**.

In concurrence with the "vertical" movement of mirror 231 along the curved surfaces of guide members 246, it is necessary to have a corresponding rotational movement imparted to mirror 229 in order to keep the aforesaid mirrors, 229 and 231, in optical alignment. To provide optical alignment of mirror 229 with all positions of mirror 231, the angular change of mirror 229 must be half the angular change of arms 256 and **256*a* about their shaft 257. Briefly, this is accomplished by an angle divider arrangement (shown in detail in Fig. 4) consisting of the links 258 and 259, a guide 262 which is affixed to the mirror frame 261, a sliding block 264, and the pin 257*a*. Movement of mirror 229 is brought about as a result of movement imparted to pin 257*a*. This is accomplished whenever the arms 256 and 256*a* are moved about the shaft 257, since the lower end of link 258 is pivoted to arm 256*a* by pin 265, and the right end of link 259 is pivoted to frame 274 by pin 259*a* (Figs. 1 and 4). The left end of link 259 and the upper end of link 258 are pivotally connected by pin 257*a*. The mirror frame 261 which is pivotally mounted on shaft 257, has a guide 262 extending therefrom. This extension 262 is biased by spring 263 so as to maintain constant contact with the under side of block 264 carried by pin 257*a*. Thus, should the arm 256*a* be moved in a clockwise direction (Fig. 1) about its shaft 257, a so-called scissors type action will occur with respect to links 258 and 259, whereby the block 264 will be moved in a generally upward direction. Thus, as stated hereinabove, this scissors action will cause pin 257*a* and block 264 to be re-located with respect to their position prior to the time that a clockwise movement was imparted to arm 256*a*. Mirror frame 261 will also be moved a related amount in a clockwise direction about shaft 257 due to the bias action imparted thereto by spring 263. Accordingly, mirrors 229 and 231 are kept in optical alignment with the lens 238**.

It is by the optical projection apparatus described hereinabove that the image of primary card information may be shifted in either one or both directions of a plane coordinate system, and thereby be directed to a selected area of the photoconductive insulating layer 124 of xerographic drum 49. As a result, information to be found anywhere on the face of a primary card, within limits defined by the width of the xerographic drum, may be transferred to a selected location on a corresponding secondary card. As stated previously, this can be accomplished by operation of cranks 241 (Fig. 2) and 247 (Figs. 2 and 3). With only these simple manual controls to effect a shift of the optical image appearing on the curved surface of xerographic drum 49 (Fig. 1), it is clear that provision must be made to keep the optical images projected onto the curved xerographic drum surface in focus wherever they may be applied. This is accomplished in the present device by moving mirror 231 along the curved surfaces of guide members 246. The optical distance measured from scanning slot 227 to the surface of xerographic drum 49 remains constant. This optical distance is measured from scanning slot 227 to mirror 229, then to mirror 231, and finally to the photoconductive insulating layer 124. Furthermore, this distance (Fig. 1) must be the same whether the image is projected along the line LL (lower limit) or the line UL (upper limit), in order to keep the image applied to the drum surface in focus.

The guide members 246 are positioned so that they define a portion of an ellipse which has as its two foci respectively at the center of the xerographic drum 49, and the center of the shaft 257. This is done because the optical distance from scanning slot 227 to mirror 229 and the radial distance from the surface of xerographic drum 49 to the center of the said drum, are each always of constant magnitude. Since, by geometry, the sum of the straight line distances from any point on an ellipse to the two foci is a constant, the sum of the two distances measured from the surface of mirror 231 on the ellipse to the axis 257 and to the xerographic drum surface, is always constant. Thus, as stated previously, in view of the fact that the radius of drum 49 is a constant, and since the distance from the scanning slot 227 to the center of shaft 257, is a constant, the optical path from the primary card 21 being scanned to the drum surface 124 will always be a constant notwithstanding the position of the mirrors.

In summation, the image of printed information on a primary card 21 (see also Fig. 4 of the Kelly application) can be projected onto the surface of the xerographic drum along the line UL, the line LL, or anywhere therebetween, simply by operating crank 247. To keep the optical image so projected in constant focus, the mirror 231 is caused to follow an elliptical path as defined by the curved surfaces of guide members 246. The lens 238 and the mirror 229 move in corresponding relationship with mirror 231 so that all three elements always remain in optical alignment. A so-called horizontal shift of the image projected onto the surface of xerographic drum 49 may be had by operating crank 241 and thereby moving lens 238 in a direction normal to the view shown in Fig. 1.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

In the claims:

1. In an electrophotographic machine having an optical record scanning station and a rotating photosensitive drum, the combination of: optical image projection apparatus for projecting an optical image obtained from said optical record scanning station onto the surface of said drum and comprising light source means so arranged as to project light energy onto said scanning station, a first mirror, a second mirror pivotable about an axis parallel to the axis of said photosensitive drum and located at a fixed distance from said scanning station; means for advancing source information records through said scanning station at a speed correlated to the peripheral speed of said rotating drum so that an image of the source information on each record is projected onto said second mirror, then reflected therefrom onto said first mirror, and finally reflected from said first mirror onto the surface of said photosensitive drum; and manually operative means for pivoting said second mirror about its pivotal axis and for moving said first mirror along a predetermined path, so as to maintain constant the distance of the optical path from said second mirror, to said first mirror, to the surface of said drum, whereby the area on said photosensitive drum onto which the image of the source information on each record is projected may be varied.

2. In a xerographic printer having a rotatable xerographic drum and employing a light scanning system for converting information from a record medium into an optical image: an optical system for accepting said optical image and projecting said image onto the surface of said xerographic drum, said optical system including a first pivotally mounted mirror for accepting said optical image, an optical lens aligned on the axis of reflecting of said first mirror, a second mirror adapted for movement along a prescribed path and aligned on the optical axis of said lens for projecting said optical image onto the surface of said xerographic drum; manually operative means for positioning said second mirror anywhere along said prescribed path; a mechanical structure interconnecting said first mirror and said second mirrors, and supporting said optical lens for maintaining said first and second mirrors and said lens in optical alignment with each other and the optical image accepted from said light scanning system when said manually operative means is operated to move said second mirror along said prescribed path, whereby said optical image, as reflected by said second mirror, may be displaced a physical distance, geometrically related to the movement along said prescribed path of said second mirror, and impressed at a correspondingly displaced position on the circumferential periphery of said xerographic drum.

3. In a xerographic printer as claimed in claim 2 further characterized in the provision of a second manually operative mechanism for physically displacing said lens system in a direction parallel to the pivotal axis of said first mirror and perpendicular to said prescribed path of said second mirror, whereby said optical image, reflected by said second mirror, may be projected onto the surface of said drum at a location displaced parallel to the axis of said drum.

4. In a xerographic printer employing a light scanning station for converting information from a record medium into an optical image for projection onto the surface of a xerographic drum, the combination of: a first mirror pivotally supported on an axis parallel to the axis of said xerographic drum; a second mirror; mechanical structure for causing said second mirror to move along an elliptical path, the foci of said elliptical path being the axis of said drum and the pivotal axis of said first mirror; a mechanical mechanism interconnecting said first and second mirrors for maintaining in optical alignment said first and second mirrors when said second mirror is positioned anywhere along its elliptical path, whereby the optical image of the information on said record medium can be shifted along the circumferential periphery of said xerographic drum by movement of said second mirror along its elliptical path, and corresponding pivotal movement of said first mirror is effected by said interconnecting mechanical mechanism.

5. In a xerographic printer as claimed in claim 4 further characterized in that an optical lens structure is supported by said interconnecting mechanical mechanism on the optical path between said first mirror and said second mirror; and the provision of additional mechanical structure for displacing said optical lens parallel to the pivotal axis of said first mirror and maintaining said lens on the optical path of said first and second mirrors, whereby displacement of said optical lens results in a displacement of the optical image, of the information contained on said record medium, projected on said drum, parallel to the axis of said drum.

6. In a record controlled machine wherein information on a record medium is converted into an optical image for projection on a rotatable drum, the combination including: an optical system for accepting the image of the information contained on said record and projecting said image on the surface of said drum; first manually operative mechanical means, mechanically linked to said optical system, for displacing parallel to the axis of said drum the physical location on said drum at which said optical image of information on said record medium is projected; and second manually operative mechanical means, operative independently of said first means and mechanically linked to said optical system, for displacing circumferentially along the periphery of said drum the physical location at which said optical image of the information on said record medium is projected.

7. An optical system for accepting an optical image along a first fixed optical path and adjustable to project said image accepted along said first fixed optical path anywhere on the peripheral surface of a drum; said optical system including first and second mirrors having their faces optically aligned on an optical path and a lens structure interposed in the optically aligned path between said first and second mirrors; first manually adjustable mechanical structure for physically displacing said first and second mirrors and said lens structure so as to maintain their optical alignment and to effect shifting of said optical image along the peripheral surface of said drum in a circumferential direction; and a second independently manually operative mechanical structure for modifying the optical path between said first and second mirrors by movement of said lens structure so as to effect shifting of the optical image impressed on the peripheral surface of said drum, in a direction parallel to the axis of said drum.

No references cited.

UNITED STATES PATENT OFFICE

CERTIFICATE OF CORRECTION

Patent No. 2,807,190 September 24, 1957

Derk J. Oldenboom

It is hereby certified that error appears in the printed specification of the above numbered patent requiring correction and that the said Letters Patent should read as corrected below.

Column 7, line 10, for "reflecting" read -- reflection --.

Signed and sealed this 12th day of November 1957.

(SEAL)

Attest:

KARL H. AXLINE

Attesting Officer

ROBERT C. WATSON

Commissioner of Patents